United States Patent [19]

Bivens et al.

[11] Patent Number: 5,403,504
[45] Date of Patent: Apr. 4, 1995

[54] PROCESS FOR HEATING AND COOLING USING SUBSTANTIALLY CONSTANT BOILING COMPOSITIONS OF FLUORINATED HYDROCARBONS

[75] Inventors: Donald B. Bivens, Kennett Square, Pa.; Mark B. Shiflett, Newark; Akimichi Yokozeki, Wilmington, both of Del.

[73] Assignee: E. I. Du Pont de Nemours and Company, Wilmington, Del.

[21] Appl. No.: 116,937

[22] Filed: Sep. 10, 1993

Related U.S. Application Data

[63] Continuation-in-part of Ser. No. 907,992, Jul. 2, 1992, which is a continuation-in-part of Ser. No. 659,210, Feb. 22, 1991, abandoned, which is a continuation-in-part of Ser. No. 628,000, Dec. 17, 1990, abandoned.

[51] Int. Cl.$^6$ .................................................. C09K 5/04
[52] U.S. Cl. .............................. 252/67; 252/DIG. 9; 62/114
[58] Field of Search .............. 252/67, DIG. 9; 62/114

[56] References Cited

U.S. PATENT DOCUMENTS

| | | |
|---|---|---|
| 4,174,295 | 11/1379 | Bargigia et al. ............... 252/305 |
| 4,978,467 | 12/1990 | Shankland et al. ............. 252/69 |
| 5,185,094 | 2/1993 | Shiflett ......................... 252/67 |

FOREIGN PATENT DOCUMENTS 64-79288  3/1989 Japan.
1-108291  4/1989 Japan.

OTHER PUBLICATIONS

McLinden & Didion's article "Quest For Alternatives" (Ashrae Journal, Dec. '87).

Vinyard, Sand & Statt's article "Selection of Ozone--Safe, Nonazeotropic Refrigerant Mixtures for Capacity Modulation in Residential Heat Pumps" (Ashraie Transactions 1989, vol. 95, Part 1).

Extract fr. OakRidge Nat. Lab. "Environmental, Health, and CFC Substitution Aspects of the Ozone Depletion Issue", Apr. 1989.

Article "Beyond CFCs: Extending the search for new refrigerants": (presented at Sep. 1989) Ashrae CFC Technology Conf., Gaithersburg, Md.

Research Disclosure #14623, vol. 146, Jun. 1976.

*Primary Examiner*—Christine Skane

[57] ABSTRACT

Constant boiling mixtures of pentafluoroethane and difluoromethane are useful as refrigerants, aerosol propellants, heat transfer media, gaseous dielectrics, fire extinguishing agents, expansion agents for polyolefins and polyurethanes, and as power cycle working fluids.

2 Claims, No Drawings

PROCESS FOR HEATING AND COOLING USING SUBSTANTIALLY CONSTANT BOILING COMPOSITIONS OF FLUORINATED HYDROCARBONS

CROSS-REFERENCE TO RELATED APPLICATION

This application is a continuation-in-part of U.S. application Ser. No. 07/907,992, filed Jul. 2, 1992, which was a continuation-in-part of U.S. application Ser. No. 07/659,210, filed Feb. 22, 1991, now abandoned, which was a continuation-in-part of U.S. application Ser. No. 07/628,000, filed Dec. 17, 1990, now abandoned.

FIELD OF THE INVENTION

This invention relates to constant boiling mixtures for use as refrigerants, aerosol propellants, heat transfer media, gaseous dielectrics, fire extinguishing agents, blowing or expansion agents for polymers such as polyolefins and polyurethanes and as power cycle working fluids. More particularly, it relates to constant boiling mixtures of fluorinated hydrocarbons. Specifically this invention relates to the use of mixtures of pentafluoroethane (HFC-125) and difluoromethane (HFC-32) as replacements for Refrigerant 22 (R-22) or Refrigerant 502 (R-502) chlorodifluoromethyl (HCFC-22) and chloropentafluoroethane (CFC-115) that has been used as the refrigerant in numerous commercial applications.

BACKGROUND OF THE INVENTION

Recently the long-term environmental effects of chlorofluorocarbons have come under substantial scientific scrutiny. It has been postulated that these chlorine-containing materials decompose in the stratosphere, under the influence of ultraviolet radiation, to release chlorine atoms. Chlorine atoms are theorized to undergo chemical reaction with the ozone layer in the stratosphere. This reaction could deplete or at least reduce the stratospheric ozone layer, thus permitting harmful ultraviolet radiation to penetrate the earth's protective ozone layer. A substantial reduction of the stratospheric ozone layer could have a serious deleterious impact on the quality of life on earth.

Refrigerant 22 and Refrigerant 502, the azeotropic mixture of about 47–50 weight percent HCFC-22 and 53–50 weight percent CFC-115 (the azeotrope is composed of 48.8 weight percent HCFC-22 and 51.2 weight percent CFC-115) have long been used as refrigerants in most of the country's air-conditioners, heat pumps and supermarket refrigeration cases. However, since CFC-115 is a chlorofluorocarbon compound which is being phased out by the year 2000 and HCFC-22 is a hydrochlorofluorocarbon which will be phased out in the year 2005 for new equipment, the industry is required to replace R-22 or R-502 with environmentally safer fluorinated hydrocarbons.

The tetrafluoroethanes (HFC-134 and its isomer (HCFC-134a) have been mentioned as possible substitutes. However, the low vapor pressures (relatively high boiling points) limit the refrigeration capacity of these compounds, making them undesirable in many R-22 and R-502 applications. Also, pentafluoroethane (HFC-125) has been suggested as a replacement for R-502, but its' energy efficiency (heat removed by the evaporator divided by the power to compress the vapor) is 10% lower than R-502. Consequently, newly designed equipment would be required to achieve the refrigeration currently needed for supermarket applications, cooling for air-conditioning applications and heating for heat pumps applications.

Mixtures of environmentally safe materials might also be used if the desired combination of properties could be attained in a simple (not constant boiling) mixture. However, simple mixtures create problems in the design and operation of the equipment used in refrigeration systems. These problems result primarily from component separation or segregation in the vapor and liquid phases.

Azeotropic or constant boiling mixtures of two or more components, where the composition of the vapor and liquid phases are substantially the same at the temperatures and pressures encountered in the refrigeration cycle, would appear to be the answer. Included in the definition of constant boiling mixtures are near-azeotropic mixtures. U.S. Pat. No. 4,810,403 teaches that near-azeotropic mixtures maintain a substantially constant vapor pressure even after evaporative losses, thereby exhibiting constant boiling behavior.

It is an object of the present invention to provide a constant boiling composition of at least two hydrofluorocarbons that is low boiling, is non-flammable, and suitable for use as a refrigerant, aerosol propellant, a heat transfer medium, a gaseous dielectric, a fire extinguishing agent, an expansion or blowing agent for polymers and as a power cycle working fluid.

SUMMARY OF THE INVENTION

According to the present invention, a substantially constant boiling composition has been discovered that comprises about 10–90 weight percent pentafluoroethane, $CF_3CHF_2$ also known as HFC-125, and about 90–10 weight percent difluoromethane, $CH_2F_2$ also known as HFC-32, that is suitable for the aforementioned uses, particularly for use in the refrigeration cases found in supermarkets and air-conditioners or heat pumps. The preferred compositions s comprise about 13–61 weight percent HFC-125 and about 39–87 weight percent HFC-32. More preferred compositions comprise about 13–23 weight percent HFC-125 and about 77–87 weight percent HFC-32; but the most preferred is the azeotropic composition itself of about 18.5 weight percent HFC-125 and about 81.5 weight percent HFC-32 determined at −15.3° C. at 70.2 psia.

The preferred, more preferred and most preferred compositions described above are based on their close proximity to the azeotropic composition. However, the commercial applications of this invention will be as a replacement for R-22 and R-502 in current commercial equipment. Unexpectedly, it has been found that compositions rather distant from the azeotropic composition remain substantially constant boiling; are less flammable (since they contain far less than 81.5% of HFC-32); operate in refrigeration equipment at lower compression temperatures; match the surface tension of R-502; in short, operate similar in the commercial equipment that currently employs R-22 or R-502.

Such appealing compositions for commercial operations comprise about 10–49 weight percent HFC-32 and about 51–90 weight percent HFC-125, preferably 10–45 weight percent HFC-32 and about 55–90 weight percent HFC-125. The more preferred commercial compositions comprise about 15–40 weight percent HFC-32 and about 60–85 weight percent HFC-125; and the most preferred comprise about 20–30 weight percent HFC- 32 and about 70–80 weight percent HFC-125. These compositions display substantially constant boiling characteristics, i.e., less than about 1.5% difference between pressures at the dew point and bubble point, at a vapor pressure of about 210 to 240 psia, specifically 211–235 psia, at 25° C.

The compositions of this invention are particularly useful in refrigeration applications since they maintain their stability and their azeotrope-like properties at temperatures of −30° F. to 115° F. and pressures of 24 psia to 415 psia as shown in Examples 3–9 hereinafter. As a matter of information, the compositions of this invention may be used successfully at temperatures as low as −50° F. to temperatures as high as 350° F.

The compositions of this invention (about 10 to about 49 weight percent HFC-32 and about 51 to about 90 weight percent HFC-125) display surprisingly excellent energy efficiency when used in heat pumps that currently use HCFC-22, chlorodifluoromethane. The data presented in Example 10 show mixtures of HFC-32 and HFC-125 containing 40–60% HFC-125 have about the same to possible higher energy efficiency compared with R-22.

As stated earlier, another essential property in the development of alternative refrigerants for use in most commercial applications, is non-flammability. Pure HFC-32 is flammable. HFC-125 is added to reduce the flammability of the mixtures. The flammability limit, as determined by the Underwriters Laboratories Inc., in mixtures of HFC-32 with HFC-125 has been determined to be about 54 weight percent HFC-32 (about 46 weight percent HFC-125) using the standard method described in ASTM 681E in air at 100° C. In Example 11, it is shown that charging the vapor phase with mixtures containing 50 or more weight percent HFC-32 (correspondingly, 50 or less weight percent HFC-125) will result in vapor compositions within the equipment that is above the 54 weight percent HFC-32 flammability limit; while using the substantially constant boiling mixture of this invention containing less than about 49 weight percent HFC-32 will provide non-flammable mixtures within the equipment.

The novel azeotrope and substantially constant boiling compositions of the invention exhibit dew and bubble points with virtually no pressure differentials, no greater than about 1.5%. As is well known in the art, the difference between dew point and bubble point pressures is an indication of the constant boiling behavior of mixtures. The pressure differentials demonstrated by the substantially constant boiling mixtures of the invention are very small when compared with those of several known, non-azeotropic, binary compositions, namely, (50+50) weight percent mixtures of pentafluoroethane (HFC-125) and 1,1,1,2-tetrafluoroethane (HFC-134a) and chlorodifluoro-methane (HCFC-22) and 1-chloro-1,1-difluoroethane (HCFC-142b), respectively. The pressure differentials demonstrated by the substantially constant boiling mixtures of the invention are also smaller than values for near azeotropic mixtures of HCFC-22, HFC-152a and HCFC-124 described in U.S. Pat. No. 4,810,403.

These data, which are shown in Table 1, confirm the azeot behavior of the compositions claimed in this invention.

TABLE 1

| Refrigerant Composition | Pressures (psia) at 25° C. | | |
|---|---|---|---|
| | Dew Point | Bubble Point | Difference |
| (50 + 50) HFC-125 + HFC-134a | 129.5 | 147.8 | 18.3 |
| (50 + 50) HCFC-22 + HCFC-142b | 73.4 | 97.5 | 24.1 |
| (36 + 24 + 40) HCFC-22 + HFC-152a + HCFC-124 | 82.8 | 95.1 | 12.3 |
| (10 + 90) HFC-125 + HFC-32 | 245.7 | 245.8 | 0.1 |
| (18.5 + 81.5) HFC-125 + HFC-32 | 244.8 | 244.8 | 0 |
| (25 + 75) HFC-125 + HFC-32 | 243.2 | 243.7 | 0.5 |
| (50 + 50) BFC-125 + HFC-32 | 235.4 | 237.3 | 1.9 |
| (60 + 40) HFC-125 + HFC-32 | 230.6 | 233.3 | 2.7 |
| (90 + 10) HFC-125 + HFC-32 | 209.1 | 211.5 | 2.4 |

For the purpose of clarifying this disclosure, "azeotropic" or "constant boiling" is intended to mean also essentially azeotropic or essentially constant boiling. In other words, included within the meaning of these terms are not only the true azeotrope described above, at −15.3° C. at 70.2 psia, but also other compositions containing the same components in different proportions, which are true azeotropes at other temperatures and pressures, as well as those equivalent compositions which are part of the same azeotropic system and are also substantially constant boiling. As is well recognized in the art, there is a range of compositions which contain the same components as the azeotrope, which not only will exhibit essentially equivalent properties for refrigeration and other applications, but which will also exhibit essentially equivalent properties to the azeotrope composition at −15.3° C. and 70.2 psia in terms of constant boiling characteristics or tendency not to segregate or fractionate on boiling.

The novel azeotropic mixtures may be used to produce refrigeration by condensing the mixtures and thereafter evaporating the condensate in the vicinity of a body to be cooled. The novel azeotropic mixtures may also be used to produce heat by condensing the refrigerant in the vicinity of the body to be heated and thereafter evaporating the refrigerant.

The use of azeotropic mixtures eliminates the problem of component fractionation and handling in system operations, because azeotropic mixtures behave essentially as a single substance. Several of the substantially constant boiling mixtures also offer the advantage of being essentially non-flammable.

It should be understood that one or more of the compounds shown in Table 2 can be combined with the substantially constant boiling binary mixtures of HFC-125/HFC-32 to provide ternary or higher substantially constant boiling mixtures for similar uses while adding advantageous properties unique to the added component(s).

TABLE 2

| Nomenclature | Chemical Formula |
|---|---|
| HCFC-22 | $CHClF_2$ |
| HFC-134a | $CF_3CH_2F$ |
| HFC-134 | $CHF_2CHF_2$ |
| HFC-143a | $CH_3CF_3$ |
| HFC-161 | $CH_2FCH_3$ |

TABLE 2-continued

| Nomenclature | Chemical Formula |
|---|---|
| FC-218 | $CF_3CF_2CF_3$ |
| Propane | $CH_3CH_2CH_3$ |
| HFC-23 | $CHF_3$ |
| HFC-227ea | $CF_3CHFCF_3$ |

The invention will be more clearly understood by referring to the examples which follow.

EXAMPLE 1

A phase study was made on pentafluoroethane and difluoromethane wherein the composition was varied and the vapor pressures measured at a constant temperature of $-15.3°$ C. An azeotropic composition was obtained, as evidenced by the maximum vapor pressure observed, and was identified as follows:

Pentafluoroethane = 18.5 ± 2 weight percent
Difluoromethane = 81.5 ± 2 weight percent
Vapor Pressure = 70.2 psia at $-15.3°$ C.

EXAMPLE 2

A phase study was made on pentafluoroethane and difluoromethane to verify minimal fractionation and change in vapor pressure during a vapor loss.

A blend was prepared in a 75 cc stainless steel cylinder consisting of pentafluoroethane and difluoromethane. The cylinder was agitated with a magnetic stirrer and submerged in a constant temperature bath at 23.8° C. The vapor space was allowed to leak at a slow rate. The vapor pressure was constantly measured using a pressure transducer and the vapor was sampled at various times during the experiment and analyzed using a standard gas chromatography method. Initial and final liquid concentrations were also analyzed by gas chromatography. Initial liquid (IQ), final liquid (FQ), vapor compositions, vapor pressure data, and change in vapor pressure from the initial vapor pressure are presented in Table 3.

TABLE 3

| Sample | % Loss | Composition HFC-32 (wt. %) | HFC-125 (wt. %) | Vapor Pressure (psia) | Change Pressure (%) |
|---|---|---|---|---|---|
| IQ | 0 | 39.4 | 60.6 | 226.5 | 0 |
| 1 | 5.1 | 44.5 | 55.5 | 226.3 | 0.09 |
| 2 | 10.3 | 43.4 | 56.6 | 226.2 | 0.13 |
| 3 | 15.4 | 43.9 | 56.1 | 226.1 | 0.19 |
| 4 | 20.6 | 43.8 | 56.2 | 225.9 | 0.27 |
| 5 | 25.7 | 42.6 | 57.4 | 225.7 | 0.35 |
| 6 | 30.8 | 43.0 | 57.0 | 225.5 | 0.44 |
| 7 | 36.0 | 42.8 | 57.2 | 225.3 | 0.53 |
| 8 | 41.1 | 42.8 | 57.2 | 225.1 | 0.62 |
| 9 | 46.2 | 42.4 | 57.6 | 224.9 | 0.71 |
| 10 | 51.4 | 41.6 | 58.4 | 224.6 | 0.84 |
| 11 | 56.5 | 41.1 | 58.9 | 224.2 | 1.02 |
| 12 | 61.7 | 40.5 | 59.5 | 223.9 | 1.15 |
| 13 | 66.8 | 39.7 | 60.3 | 223.5 | 1.32 |
| 14 | 71.9 | 38.7 | 61.3 | 223.0 | 1.55 |
| 15 | 77.1 | 37.7 | 62.3 | 222.4 | 1.81 |
| 16 | 82.2 | 36.0 | 64.0 | 221.6 | 2.16 |
| 17 | 87.4 | 33.7 | 66.3 | 220.5 | 2.65 |
| FQ | 89.2 | 27.0 | 73.0 | 220.0 | 2.87 |

These data demonstrate that with more than 80% of the original charge depleted, the vapor pressure has remained substantially constant (2.87% change). It is important to note that the difluoromethane concentration has gone down in both the liquid and vapor phases during leakage. Therefore, since the initial concentration is non-flammable, recognizing that difluoromethane is flammable, the blend will not become flammable in the event of vapor loss.

EXAMPLES 3–9

Evaluation of the refrigeration properties of the azeotropic mixtures of the invention versus HCFC-22, Refrigerant 502 and pentafluoroethane (HFC-125) alone, are shown in Table 4.

TABLE 4

COMPARISON OF REFRIGERATION PERFORMANCE

| | Control | Control | Control | Ex. 3 | Ex. 4 | Ex. 5 | Ex. 6 | Ex. 7 | Ex. 8 | Ex. 9 |
|---|---|---|---|---|---|---|---|---|---|---|
| | | | | \multicolumn{7}{c}{Weight Percentages} | | | | | | |
| | HCFC-22 | R-502 | BFC-125 | 10/90 125/32 | 18.5/81.5 125/32 | 50/50 125/32 | 60/40 125/32 | 70/30 125/32 | 80/20 125/32 | 90/10 125/32 |
| Evaporator Temp. (deg F.) | −30 | −30 | −30 | −30 | −30 | −30 | −30 | −30 | −30 | −30 |
| Evaporator Pressure (psia) | 19.6 | 24.0 | 26.7 | 33.9 | 33.8 | 32.9 | 32.2 | 31.3 | 30.1 | 28.5 |
| Condenser Temp. (deg F.) | 115 | 115 | 115 | 115 | 115 | 115 | 115 | 115 | 115 | 115 |
| Condenser Pressure (psia) | 258 | 282 | 327 | 415 | 412 | 396 | 388 | 379 | 365 | 349 |
| Compressor Discharge Temp. (deg f.) | 303 | 239 | 223 | 357 | 345 | 300 | 284 | 269 | 254 | 239 |
| Coefficient Of Performance | 1.97 | 1.89 | 1.69 | 1.81 | 1.81 | 1.80 | 1.79 | 1.77 | 1.75 | 1.71 |
| Refrigeration Capacity (Btu/min) | 76.6 | 80.0 | 79.4 | 124 | 122 | 112 | 107 | 102 | 95 | 87 |
| Surface Tension (dyne/cm) | — | 14.7 | — | 18.2 | — | 16.2 | 15.7 | — | 14.4 | — |

"Coefficient of performance" (COP), is the ratio of net refrigeration effect to the compressor work. It is a measure of refrigerant energy efficiency.

Net refrigeration effect is the change in enthalpy of the refrigerant in the evaporator, i.e., the heat removed by the refrigerant in the evaporator. Refrigeration Capacity is based on a fixed compressor displacement.

For a refrigeration cycle typified by the conditions shown in Table 4 for the evaporator and the condenser, the COPs shown in the examples of the invention are higher than the COP of pentafluoroethane (HFC-125) alone.

Important considerations in evaluating the performance data are compressor discharge temperature, surface tension, capacity and condenser pressure. R-502 was originally developed to replace HCFC-22 in applications with long refrigerant return lines to the compressor. Use of HCFC-22 resulted in high compressor discharge temperatures and early compressor failures. Lower compressor discharge temperatures are produced with R-502 due to the higher heat capacity of the CFC-115 component. Since one of the objectives of this invention was to develop a refrigerant to replace R-502 in existing commercial equipment with minimal changes, the replacement refrigerant must produce lower compressor discharge temperatures than with HCFC-22.

The data in Table 4 indicate that the compressor discharge temperature of HCFC-22 is matched by the mixture of 50 weight percent HFC-32. Higher concentrations of HFC-32 would result in even higher discharge temperatures. It is obvious that concentrations of HFC-32 lower than 50 weight percent, i.e., 49 weight percent, should be used to approach the discharge temperature of R-502. A match of compressor discharge temperatures for R-502 and the HFC-32/HFC-125 mixture occurs at about 10 weight percent HFC-32, and compressor design allowances would likely permit operation at somewhat higher temperatures, possibly up to 275° F., resulting in an HFC-32 concentration of about 35 weight percent.

Surface tension is another factor to consider. It is important in heat transfer performance of the refrigerant in condensers and evaporators where bubbles and droplets occur, in turn being related to system energy efficiency. In fact, it has been said that "Surface tension is one of the most important physical properties, especially when two-phase heat transfer occurs with bubble or droplet generation on surfaces." D. Jung and R. Radermacher, Transport Properties and Surface Tension of Pure and Mixed Refrigerants, ASHRAE TRANSACTIONS 1991., Vol. 97, Pt. 1. Since one of the objects of this invention was to identify a refrigerant to replace R-502, preferably for use in existing commercial equipment with minimal changes, it would be advantageous to have similar values of surface tension for R-502 and the replacement mixture. Surface tension values were calculated by the method of Brock and Bird, AICHE Journal, Vol. 1, p. 174 (1955), and are shown in Table 4. A match of surface tension values with that of R-502 occurs at about 25% HFC-32. Higher values of surface tension are less desirable, as more energy is required to remove the bubbles or droplets from heat exchanger surfaces.

The data in Table 4 also indicate that the lower concentrations of HFC-32 provide capacity and condenser pressures closer to that of R-502. The mixtures of HFC-32 and HFC-125 may also be considered as replacements for HCFC-22. The data in Table 4 again indicate that the lower concentrations of HFC-32 (10-30%) provide capacity and condenser pressures closer to that of HCFC-22.

EXAMPLE 10

The theoretical performance of a refrigerant at specific operating conditions can be estimated from thermodynamic properties of the refrigerant using standard refrigeration cycle analysis techniques: see for example, R. C. Downing, Fluorocarbons Refrigerants Handbook, Chapter 3, Prentice-Hall, 1988. The energy efficiency ratio (EER) or coefficient of performance (COP) is universally accepted and represents the relative thermodynamic efficiency of a refrigerant in a specific heating or cooling cycle involving evaporation or condensation of the refrigerant. EER or COP expresses the ratio of useful refrigeration to the energy applied by the compressor in compressing the vapor.

In Table 5 below, the result of the thermodynamic calculations are presented for a typical air conditioning cycle. The condenser temperature is typically 110° F. (43.3° C.) and the evaporator temperature is typically 48° F. (8.9° C.). Assuming isentropic compression, i.e., no loss of energy, and a compressor inlet temperature of about 70° F. (21.1° C.), the calculations were performed for a 60/40, 50/50, and 40/60 HFC-32/HFC-125 "32/125" mixture versus HCFC-22 "R-22."

TABLE 5

| Thermodynamic Performance Calculations | | | | |
|---|---|---|---|---|
| | | | Compressor Discharge Temp. | |
| Refrigerant | EER | Capacity (BTU/hr) | - (F.) | (C.) |
| R-22 | 1.0 | 1.0 | 161 | 71.7 |
| R-32 | 1.12 | 1.56 | 187 | 86.1 |
| 32/125 | | | | |
| (60/40%) | 1.06 | 1.43 | 166 | 74.7 |
| (50/50%) | 1.035 | 1.38 | 161 | 71.7 |
| (40/60%) | 1.01 | 1.32 | 156 | 68.9 |

From the data presented in Table 5, it is clear that the mixture of HFC-32/HFC-125 should decrease in energy efficiency and capacity relative to R-22 from a high at 100% HFC-32 (which is extremely flammable) to lower values as the HFC-32 concentration is reduced and the HFC-125 concentration is increased. Also, the compressor discharge temperature should decrease as the HFC-125 concentration increases. The compressor discharge temperature for mixtures containing less that 50% HFC-32 should have lower discharge temperatures than obtained using R-22. This is important with respect to using current commercial compressors when and if HFC-32/HFC-125 mixtures are substituted for R-22.

In actual tests with two 2.5 ton residential heat pumps obtained from two different manufacturers, the data shown in Table 6 below was obtained:

TABLE 6

| EER from Actual Tests | | |
|---|---|---|
| Refrigerant | Heat Pump #1 EER | Heat Pump #2 EER |
| R-22 | 1.0 | 1.0 |
| 32/125 | | |
| (60/40%) | 1.05 | .975 |
| (52/48%) | 1.04 | — |
| (50/50%) | — | .98 |
| (45/55%) | 1.045 | — |
| 40/60%) | — | .98 |

Based on the thermodynamic calculations it would be expected that the use of mixtures containing HFC-32 and HFC-125 would decrease in energy efficiency as the HFC-125 concentration increased. Specifically, these calculations show that a mixture containing about 60/40 wt % HFC-32/HFC-125 would have about 5% higher energy efficiency compared with a mixture containing about 40/60 wt % HFC-32/HFC-125 relative to R-22 operating at the same conditions. In Table 5, the 60/40 mixture EER relative to R-22 is 1.06 versus the 40/60 mixture EER relative to R-22 of 1.01.

Actual tests with the two 2.5 ton residential heat pumps manufactured by different companies show little to no difference in EER compared with R-22 for a mixture containing 40 to 60 wt % HFC-125. Heat pump $\pi 1$ over a range of compositions from 45 to 60% HFC-32, showed EERs for "32/125" mixtures relative to R-22 from about 1.04 to 1.05. Heat pump #2, over a range of compositions from 40 to 60% HFC-32 showed EERs for "32/125" mixtures relative to R-22 from about 0.98 to 0.975.

It would appear from these data and the data in the following example that the use of HFC-125/HFC-32 mixtures composed of greater than 50% HFC-125 could be used in refrigeration cycles without losing energy efficiency (at least within the range of the foregoing data up to 60% HFC-125), with a reduction in compressor discharge temperature (which would prolong compressor life) and be safer from the flammability standpoint for commercial and residential applications than mixtures of the prior art which contain at least 50% HFC-32.

EXAMPLE 11

Vapor charging experiments were run at an ambient temperature of about 23° C. Specifically, a service cylinder containing 20 lbs. of refrigerant was vapor charged into a system simulated by a second cylinder capable of receiving about 1 lb. of refrigerant.

In Experiment A, the service cylinder contained liquid refrigerant comprising 48.3 weight percent HFC-32 and 51.7 weight percent HFC-125. The resulting vapor composition in the second cylinder, the system, was 53.4 weight percent HFC-32 and 46.6 weight percent HFC-125 and was not flammable at 100° C in air according to the test in ASTM 681E.

In Experiment B, the service cylinder contained liquid refrigerant comprising 50.6 weight percent HFC-32 and 49.4 weight percent HFC-125. The resulting vapor composition in the "system" cylinder was 55.0 weight percent HFC-32 and 45.0 weight percent HFC-125 and was flammable when tested according to the method of ASTM 681E.

In Experiment C, the results were calculated (based on Experiments A and B) for a liquid refrigerant composition of 49.0 weight percent HFC-32 and 51.0 weight percent HFC-125. The resulting vapor composition in the "system" cylinder would be 53.9 weight percent HFC-32, 46.1 weight percent HFC-125 and would not be flammable.

These results are summarized in Table 7 below:

TABLE 7

| Experiment | Service Cylinder | | System Cylinder | |
|---|---|---|---|---|
| | HFC-32 (wt. %) | HFC-125 (wt. %) | HFC-32 (wt. %) | HFC-125 (wt. %) |
| A | | | | |
| Liquid | 48.3 | 51.7 | 50.5 | 49.5 |
| Vapor | 51.2 | 48.8 | 53.4 | 46.6 |
| B | | | | |
| Liquid | 50.6 | 49.4 | 52.3 | 47.7 |
| Vapor | 53.1 | 46.9 | 55.0 | 45.0 |
| C | | | | |
| Liquid | 49.0 | 51.0 | 51.1 | 48.9 |
| Vapor | 51.8 | 48.2 | 53.9 | 46.1 |

Additives such as lubricants, corrosion inhibitors, stabilizers, dyes and other appropriate materials may be added to the compositions of the invention for a variety of purposes, provided they do not have an adverse influence on the substantially constant boiling nature of the composition, its energy efficiency and its nonflammability.

We claim:

1. A process for cooling a body comprising the steps of condensing a mixture consisting essentially of a substantially constant boiling composition consisting of about 55–90 weight percent pentafluoroethane and about 45–10 weight percent difluoromethane, wherein the pressure at the dew point and bubble point differ by less than about 1.5% at a vapor pressure of about 210 to about 240 at 25° C.; and thereafter, evaporating said mixture in the vicinity of the body to be cooled.

2. A process for heating a body comprising the steps of condensing a mixture in the vicinity of the body to be heated, said mixture consisting essentially of a substantially constant boiling composition consisting of about 55–90 weight percent pentafluoroethane and about 45–10 weigh percent difluoromethane, wherein the pressure at the dew point and bubble point differ by less than about 1.5% at a vapor pressure of about 210 to about 240 psia at 25 degrees C.; and thereafter, evaporating said mixture.

* * * * *